United States Patent [19]

Strandell et al.

[11] Patent Number: 4,818,153
[45] Date of Patent: Apr. 4, 1989

[54] CUTTING INSERT HAVING MEANS FOR DETECTING WEAR

[75] Inventors: Ingemar H. Strandell, N. Rönngatan; Ingemar S. L. Svensson, Sagostigen, both of Sweden

[73] Assignee: Santrade Limited, Lucerne, Switzerland

[21] Appl. No.: 927,372

[22] Filed: Nov. 6, 1986

[30] Foreign Application Priority Data

Nov. 7, 1985 [SE] Sweden .................................. 8505260

[51] Int. Cl.$^4$ ...................... B23B 27/14; B23B 25/06; B23C 5/16
[52] U.S. Cl. .................................. 407/113; 407/118; 407/119; 73/104; 175/39; 408/144
[58] Field of Search .............. 407/118, 119, 120, 113; 408/6, 11, 144; 250/303; 378/1; 73/104; 175/39

[56] References Cited

U.S. PATENT DOCUMENTS 2,468,905  5/1949  Warren ................................. 250/303
2,938,125  5/1960  Marak .................................. 250/303

FOREIGN PATENT DOCUMENTS 815594  3/1981  U.S.S.R. ............................ 250/303

OTHER PUBLICATIONS

Carboloy Catalog, General Electric, 1980, pp. 40–41.
"Measuring Tool Wear Radiometrically", pp. 22–27, Hill and Skunda, Mech. Eng., vol. 94, No. 2, Feb. 1977.
"More About Cutting Fluids", Dr. B. Ivkovic, pp. 13–17, Industrial Lurication and Tribology, Jan., Feb., Mar., Apr., 1977.
"Atomic Tool Speeds Cutting Tests", Iron Age, May 6, 1971, pp. 53–54.
"Radioactive Techniques in Tool Wear", Bhattacharyya and Vetley, Wear, vol. 48, 1978, pp. 399–407.
"Radioactive Cutting Tools", Merchant et al., Transactions of the ASME, May 1953, 549–559.
"Comparing Two Methods for Measuring Tool Wear", Popov, Dec. 1961, Nucleonics, pp. 76–80.

Primary Examiner—Frederick R. Schmidt
Assistant Examiner—William E. Terrell
Attorney, Agent, or Firm—Burns, Doane, Swecker & Mathis

[57] ABSTRACT

Cutting insert for chip-removing machining comprising an upper face (11), a lower face (12) and, connecting those, edge surfaces (13). Lines of intersection between the edge surfaces and the upper face form cutting edges. The insert (10) has a substrate (14) comprising a metal and a photon-emitting material. The substrate (14) is covered by a photon-tight layer (15). During wear of the layer (15) the substrate (14) is exposed, and therefore the intensity and direction fo the photons can be detected for determination of the size and type of the wear damage.

11 Claims, 3 Drawing Sheets

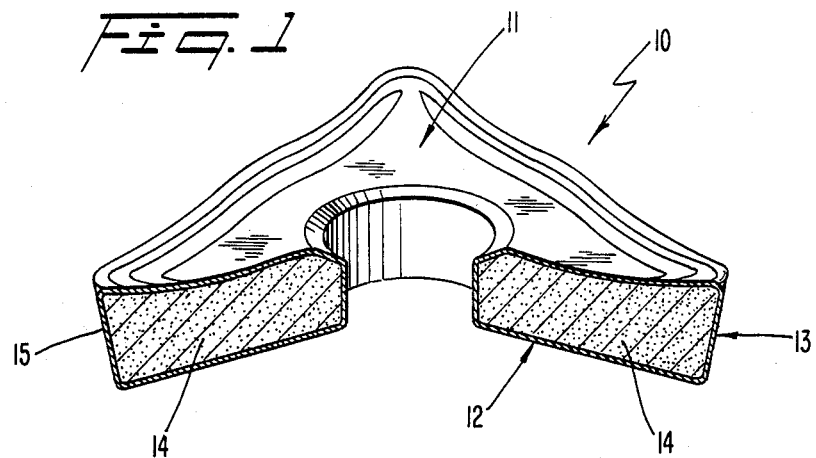
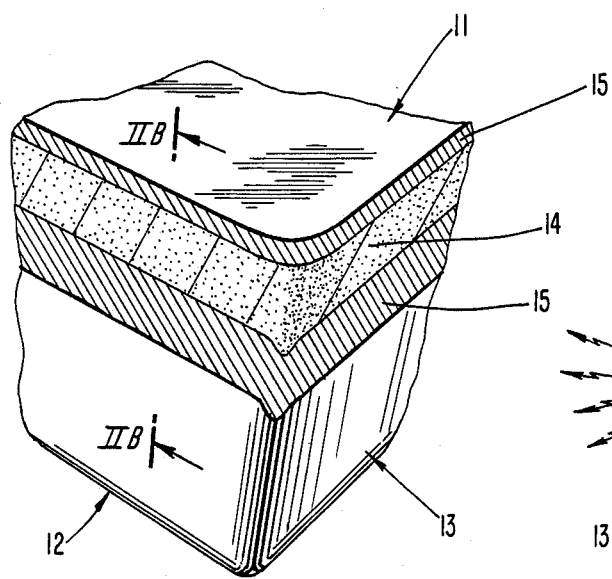

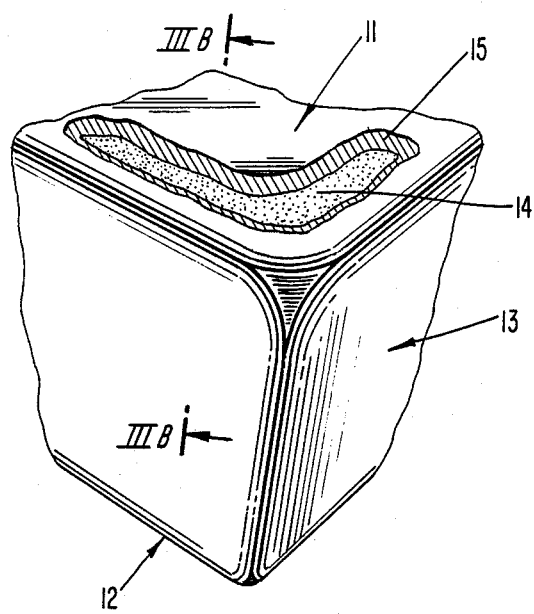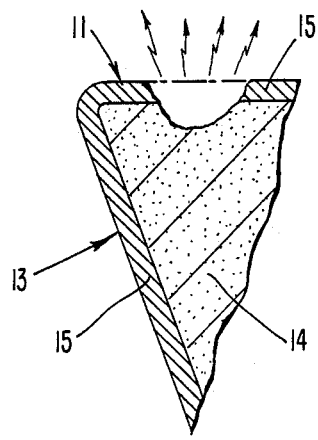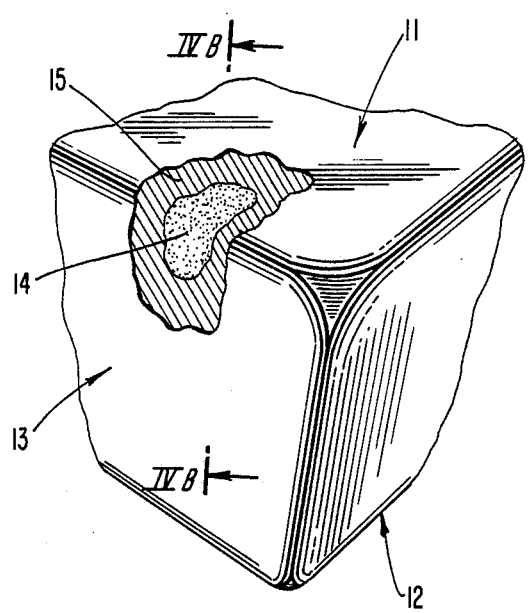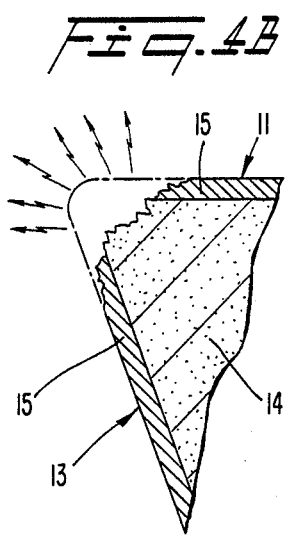

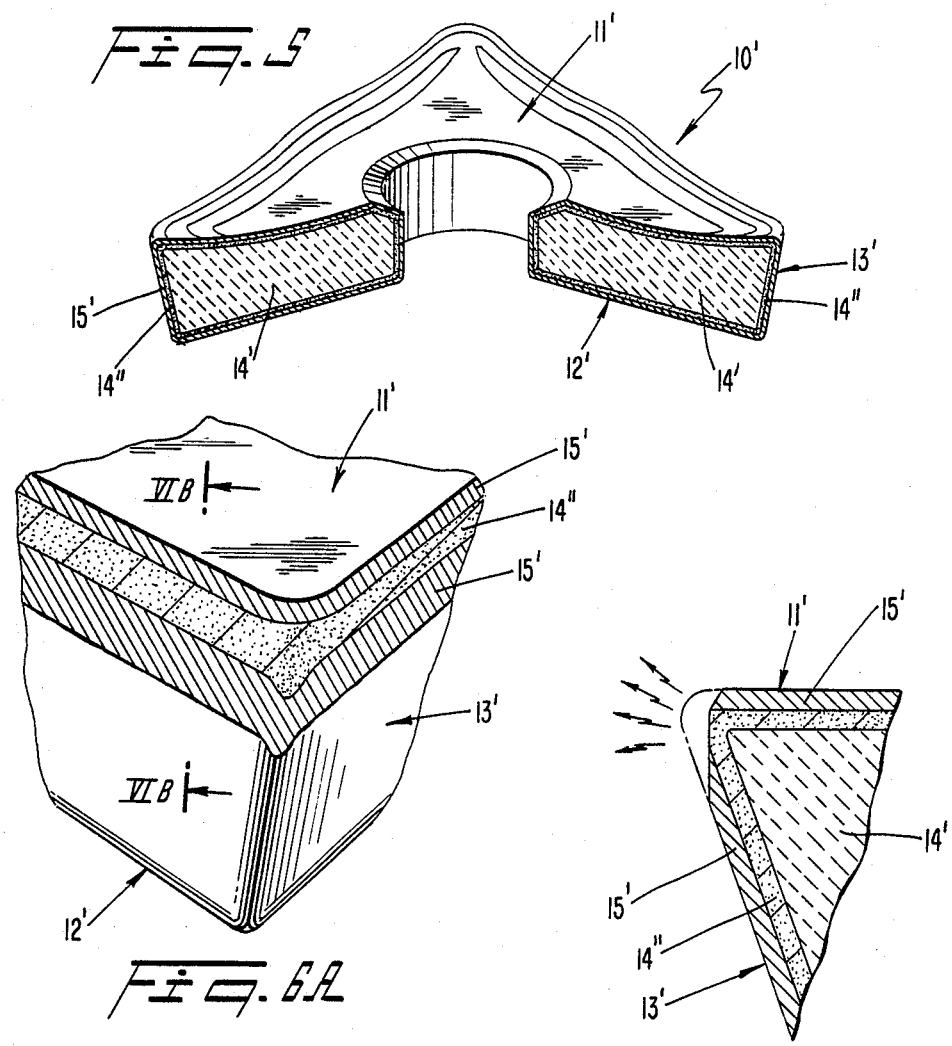
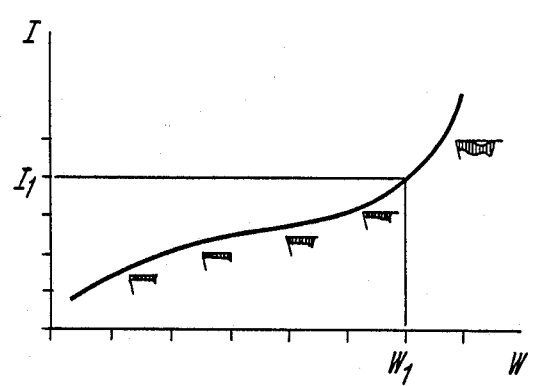

CUTTING INSERT HAVING MEANS FOR DETECTING WEAR

BACKGROUND

The present invention relates to a cutting tool having at least one cutting edge for chip removing maching comprising a substrate and at least a first layer at least partly covering the substrate. A photon-emitting material or a photon-absorbing material is provided to be exposed during wear of the first layer.

The tool life of a cutting edge is estimated with regard to ability to meet specific requirements, such as maintenance of dimensioned tolerances, surface quality and satisfactory chip breaking. When the cutting edge of the tool no longer meets these requirements the life of the tool is reached and it should be replaced.

A cutting edge is considered to be worn out when it ceases to produce a product with the wanted quality requirements, i.e. when it ceases to produce the necessary surface quality, the dimensional tolerance etc. on the work piece.

Practical experience has hitherto been the only available guidance determining to which extent wear is acceptable before interrupting the machining. Furthermore it has been time-consuming to measure crater wear on the rake face of the tool.

The present invention relates to a cutting tool which is constructed such that wear damages can be detected and determined in a simple way, manually or automatically. A good control of the condition of the tool reduces the risk for tool breakages and reduces the risk for producing defective work pieces.

SUMMARY OF THE INVENTION

There is provided a cutting insert with at least one cutting edge for chip-removing machining comprising a substrate (14;14') and at least one first layer (15;14') at least partly covering the substrate, characterized in that a photon-emitting material or photon-absorbing material is provided to be exposed during wear of the first layer (15;15').

BRIEF DESCRIPTION OF THE DRAWINGS

The invention will be more closely described hereinafter with reference to the appended drawings.

FIG. 1 shows an indexable cutting insert according to the invention, partly in section.

FIGS. 2, 2A–4 and 4A show sections of worn indexable cutting inserts according to the invention.

FIG. 5 shows an alternative embodiment of an indexable cutting insert according to the invention, partly in section.

FIGS. 6A and 6B show sections of a worn alternative indexable cutting insert according to the invention.

FIG. 7 shows an intensity/flank wear diagram for an indexable cutting insert according to the invention.

DETAILED DESCRIPTION

FIG. 1 shows an indexable cutting insert 10 comprising an upper face 11, a lower face 12 and, connecting those, edge surfaces 13. The insert 10 consists of a substrate 14 which is enclosed by a photon-tight layer 15. The substrate 14 may consist of a photon-emitting material plus a hard metal, ceramics or a metal alloy, such as tool steel (including carbon steel) or speed steel.

The layer 15 may consist of a metal oxide, metal nitride, metal carbide, boron nitride or diamond or any material that prevents propagation of photons into or out of the substrate. The photon-emitting material is preferably homogeneously mixed with the substrate but it may also be peripherally concentrated. The ceramics may be doped with the fluorescent material. by "doped" is meant that atoms of photon-emitting material are inserted into the lattice of the substrate or ceramics. One or more layer 15 may enclose the substrate.

FIG. 2A shows a part of an indexable cutting insert mainly of the type shown in FIG. 1. The insert has been subjected to flank wear at a corner portion thereof. The first layer 15 has been worn such that the underlying substrate 14 has been exposed. FIG. 2B shows the insert according to the line IIB—IIB in FIG. 2A. The flank wear is caused by the clearance face rubbing against the work piece, and therefore the exposed substrate 14 will emit photons mainly in accordance with the arrors in FIG. 2B. A detecting device (not shown) is arranged to detect the intensity and the origin of the photons, and therefore the size and the type of the wear damage can be determined. The dotted line shows the periphery of the insert before wear. The measuring of intensity and direction preferably takes place at the beginning of each pass of the insert, i.e. at a stationary insert.

FIG. 3A shows a part of a worn insert. The insert has been exposed to crater wear at a corner portion. the crater wear is caused by the chip upsetting dagainst and sliding on the rake face of the insert thereby tearing substance from the insert such that a crater is formed. FIG. 3B shows the insert according to the line IIIB—IIIB in FIG. 3A. The exposed substrate 14 will emit photons, mainly according to the arrows in FIG. 3B, when the layer 15 has been damaged. Then a detection device can detect the photons.

FIG. 4A shows a part of a worn insert. The insert has been subjected to frittering. This occurs when the material in the insert is too brittle for the actual machining or is unsuitable for large variations in temperature. FIG. 4B, which is a cross-section according to the line IVB—IVB in FIG. 4A, shows the principal direction of the photons at the frittering damage. A detecting device determins the type and extension of the damage o the basis of the intensity and direction of the photons.

FIG. 5 shows an alternative indexable cutting insert 10' according to the invention. The insert 10' comprises an upper face 11', a lower face 12' and, connecting those, edge surfaces 13'. The insert 10' consists of a substrate 14' which is enclosed by a photon-emitting layer 14''. The substrate 14' can consist of metal or ceramics. The composition of the layer 15' corresponds to the above described layer 15. The layer 14'' consists of a photon-emitting, preferably fluorescent, material homogeneously mixed with any one of the materials described in connection with the layer 15. More than one layer may surround the layer 14''.

FIGS. 6A and 6B show a part of an indexable cutting insert mainly of the type shown in FIG. 5. The insert has been subjected to flank wear at a corner portion thereof such that the underlying layer 14'' has been exposed. FIG. 6B shows the insert according to the line VIB—VIB in FIG. 6A. The exposed layer 14'' emits photon mainly according to the arrow in FIG. 6B. The photon are detected by a detecting device (not shown), and therefore the type and size of the damage can be determined. The layer 14'' will also in this case be exposed during crater wear and frittering. In comparison with the insert shown in FIGS. 1–4B this insert allows saving of the photon-emitting material.

The detecting device has at least one, preferably three, position sensitive, photon collecting units for determination of the type and size of the damage.

FIG. 7 shows an intensity- and flank wear diagram for any one of the above described inserts. The intensity I increases with increasing flank wear W, since the area of exposed photon-emitting material increases, whose photons have been detected by a detecting device. At the intensity $I_1$ the area $W_1$ has been worn and therefore the insert shall be replaced or indexed.

The photon-emitting material preferably consists of yttrium oxide $Y_2O_3$, but may also consist of phosphorus P, rare earth metal or fluorine $F_2$. Yttrium oxide is most suitable in connection with ceramics or oxide layers.

Alternatively the photon-emitting material may be replaced by a photon-absorbing material which absorbs photon with certain wave length.

The invention has been described above in connection with turning inserts. However, it should be understood that different kinds of inserts may be formed in accordance with the invention, for example inserts for drills or milling cutters. It is also possible that the provision of the photon-emitting material is limited to the area around the cutting portions of the insert and that the photon-tight layer encloses at least said material.

What is claimed is:

1. A cutting insert with at least one cutting edge for chip-removing machining comprising a substrate (14;14') and at least one first layer (15;15') at least partly covering the substrate, characterized in that said cutting insert includes a fluorescent material which is provided to be exposed during wear of the first layer (15;15').

2. Cutting insert according to claim 1, characterized in that the material is mixed with the substrate (14).

3. Cutting insert according to claim 2, characterized in that the material is homogeneously mixed with the substrate (14).

4. Cutting insert according to claim 2, characterized in that the substrate mainly consists of sintered hard metal or ceramics.

5. Cutting insert according to claim 2, characterized in that the substrate mainly consists of a metal alloy, such as tool steel, carbon steel or speed steel.

6. Cutting insert according to claim 1, characterized in that the material is arranged as a second layer (14") between the substrate (14') and the first layer (15').

7. Cutting insert according to claim 1, characterized in that the substrate (14;14') mainly consists of sintered hard metal or ceramics.

8. Cutting insert according to claim 1, characterized in that the substrate (14;14') mainly consists of a metal alloy, such as tool steel, carbon steel or speed steel.

9. Cutting insert according to claim 1, characterized in that the first layer (15;15') mainly consists of metal oxide, metal nitride, ceramics or diamond.

10. Cutting insert according to claim 9, characterized in that the substrate (14) consists of ceramics doped with the fluorescent material.

11. Cutting insert according to claim 1, characterized in that it has a polygonal basic shape comprising an upper face (11;11') and a lower face (12;12') which are connected by edge surfaces (13;13'), lines of intersection between said edge surfaces and at least one face forming cutting edges.

* * * * *